United States Patent [19]

Van Straten

[11] Patent Number: 4,728,775

[45] Date of Patent: Mar. 1, 1988

[54] INDICATOR LIGHT COVER FOR VEHICLES AND THE LIKE

[76] Inventor: George A. Van Straten, Rte. 1, Box 224, Baraga, Mich. 49908

[21] Appl. No.: 77,499

[22] Filed: Jul. 24, 1987

[51] Int. Cl.⁴ .............................................. B60L 1/02
[52] U.S. Cl. .................................... 219/202; 219/203; 219/522
[58] Field of Search ............... 219/202, 203, 520, 521, 219/522

[56] References Cited

U.S. PATENT DOCUMENTS

| | | | |
|---|---|---|---|
| 1,791,254 | 2/1931 | Von Brockdorff | 219/522 |
| 2,442,913 | 6/1948 | Abrams et al. | 219/428 |
| 3,495,259 | 2/1970 | Rocholl et al. | 219/522 |
| 3,752,348 | 8/1973 | Dickason et al. | 219/203 |
| 4,388,522 | 6/1983 | Boaz | 219/203 X |

Primary Examiner—E. A. Goldberg
Assistant Examiner—M. M. Lateef
Attorney, Agent, or Firm—Price, Heneveld, Cooper, DeWitt & Litton

[57] ABSTRACT

An indicator light for vehicles and the like including a heated lens or cover. The heated cover is operatively connected to the indicator light, and is comprised of a thermally conductive, translucent cover plate. The cover plate has interior and exterior surfaces to which an elongate electrical resistor is operatively connected in a widespread pattern to heat at least a major portion of the exterior surface of the cover. The resistor is electrically connected to the electrical system of the vehicle to induce an electric current through the cover, such that frozen particulate on the exterior surface thereof is melted for improved visibility through the indicator light and related vehicle safety.

21 Claims, 7 Drawing Figures

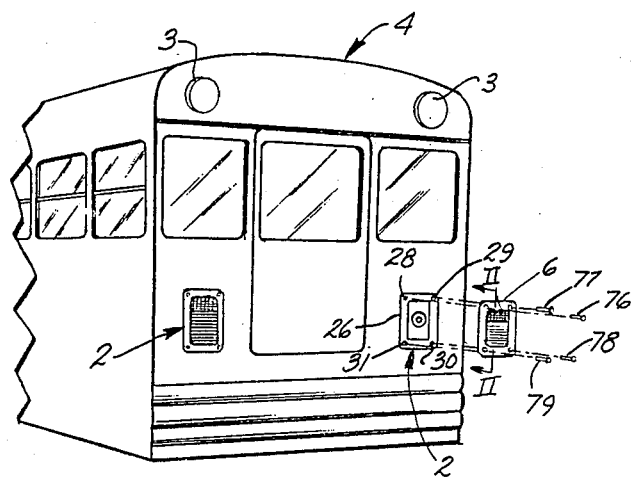
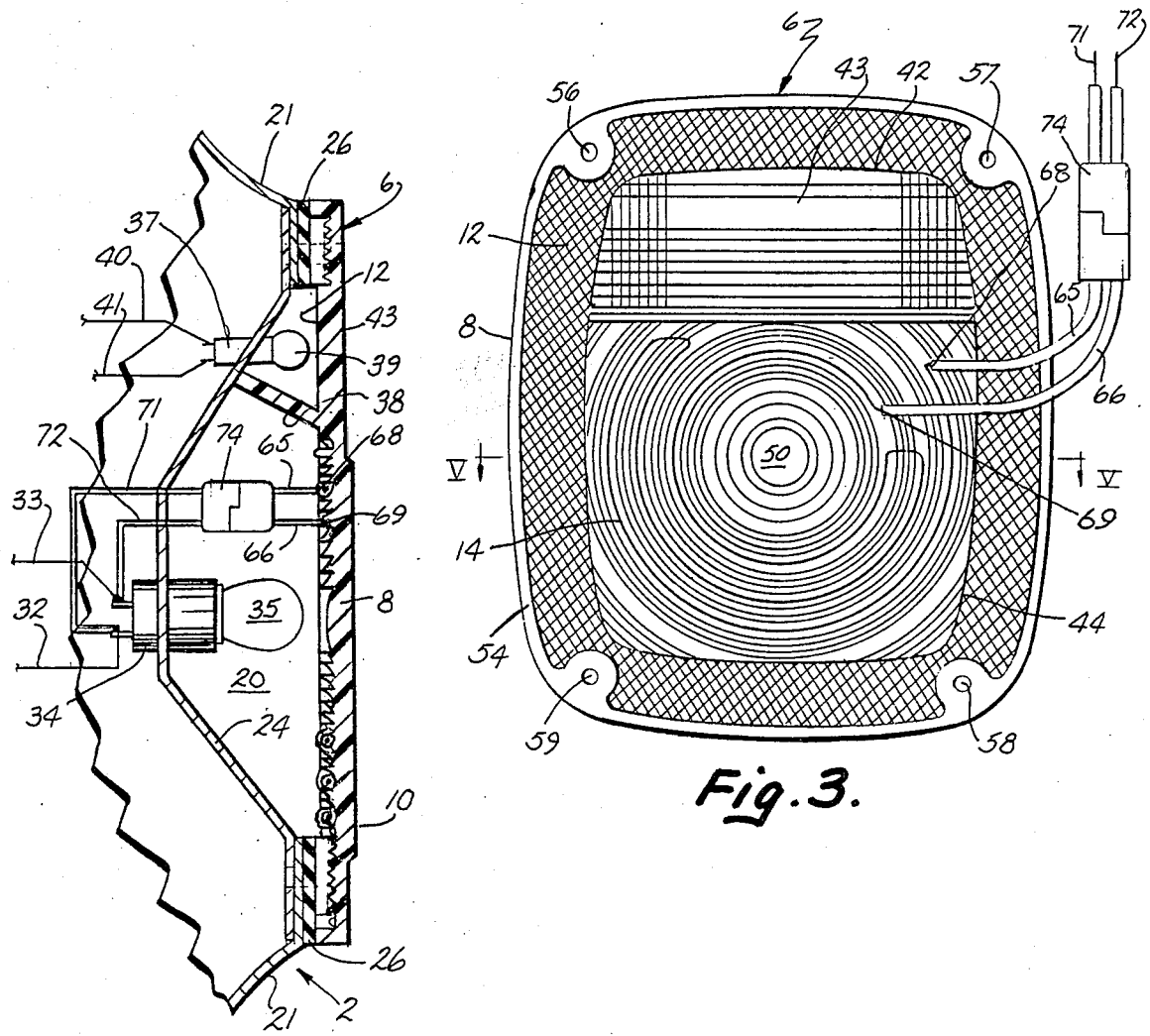

INDICATOR LIGHT COVER FOR VEHICLES AND THE LIKE

BACKGROUND OF THE INVENTION

The present invention relates to indicator lights for vehicles, and the like, and in particular to an improved, heated cover therefor.

Contemporary vehicles include indicator lights, such as turn signals, back-up lights, brake lights, emergency flashers, and the like to alert other motorists as to vehicle activity. Such indicator lights are typically covered with a removable, translucent cover that is normally in the form of a lens.

Conventional indicator lights for vehicles experience some rather significant problems on a wintry day. Frozen particulate can form on the exterior surface of the cover, thus preventing those viewing the indicator light from recognizing the signal being transmitted. This can lead to hazardous results when the driver brakes or transmits a turn signal, and the indicator light, which is hidden by ice and snow, cannot be seen by those who are following the vehicle. In particular, when an emergency vehicle, such as a snowplow or school bus, is being used on a wintry day, it is essential for facilitating vehicle safety, that drivers near the emergency vehicle see its signal, whether the signal indicates turning, braking or emergency in general.

SUMMARY OF THE INVENTION

One aspect of the present invention is to provide an improved heated cover for covering an indicator light for vehicles of the type having a self-contained electrical system. A bulb portion of the indicator light is electrically connected to the electrical system of the vehicle to selectively illuminate the bulb for indicating vehicle activity. The cover is translucent, thermally conductive, and has interior and exterior surfaces through which light from the bulb is transmitted when the bulb is illuminated and is operatively connected with the light. An elongate electrical resistor is operably connected with the cover, and arranged thereon in a sufficiently widespread pattern to heat at least a major portion of the exterior surface of the cover, yet permit light from the bulb to pass through the cover. The resistor is connected to the electrical system of the vehicle to induce an electrical current through the resistor, thereby producing sufficient heat in the cover to melt frozen particulate on the exterior surface thereof for improved visibility of the indicator light and related vehicle safety.

In one example of the present invention, the indicator light includes a switch through which the flow of electrical current can be regulated, and the bulb portion of the light comprises a 6, 12, or 24-volt direct current source. The interior surface of the cover includes a plurality of circular grooves arranged in a concentric pattern to form a lens that focuses light from the bulb. The elongate resistor comprises a flexible wire formed in concentric circular loops, and is received or positioned in selected portions of the cover grooves to avoid interference with the light transmitted by the bulb. Male and female connectors are employed to operatively connect the resistor to the self-contained electrical system of the vehicle.

The principal objects of the present invention are to provide an indicator light with a heated cover to melt frozen particulate on the exterior of the cover. An electrical resistor is mounted on the cover, such that when electrical current is induced in the resistor, sufficient heat is produced in the cover to melt the frozen particulate on the exterior surface of the cover. The melting of the frozen particulate not only facilitates vehicle safety, but also facilitates emergency winter services by snowplows, ambulances, police cars and the like, by making their movements more visible to other drivers. The indicator light has an uncomplicated construction and is particularly economical to manufacture, efficient in use, capable of long operating life and well adapted for the proposed use.

These and other features, advantages and objects of the present invention will be further understood and appreciated by those skilled in the art by reference to the following written specification, claims and appended drawings.

BRIEF DESCRIPTION OF THE DRAWINGS

FIG. 1 is a partially schematic, fragmentary, perspective view of a school bus including an exploded view of an indicator light embodying the present invention;

FIG. 2 is a fragmentary, vertical cross-sectional view of the indicator light taken along plane II—II of FIG. 1;

FIG. 3 is a rear-elevational view of a heated cover portion of the indicator light;

DETAILED DESCRIPTION OF THE PREFERRED EMBODIMENTS

Figure 4:
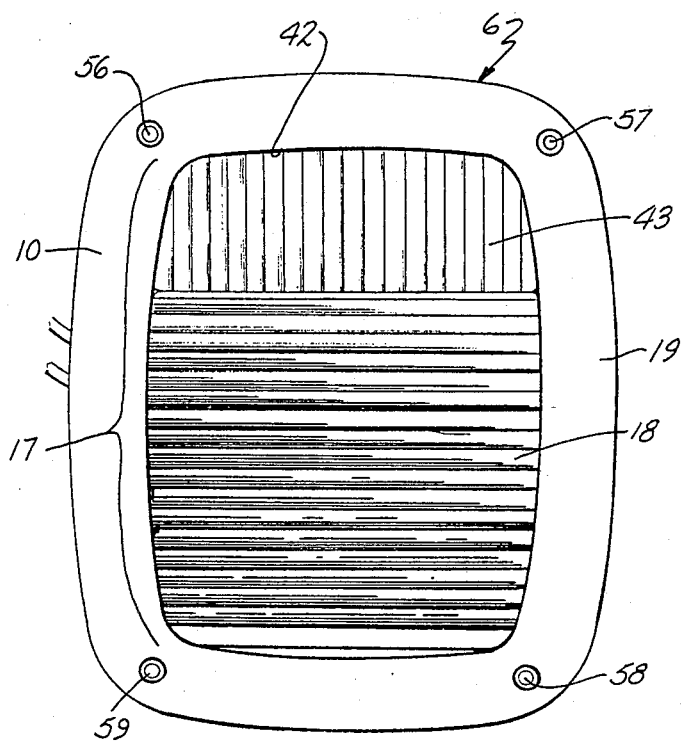
FIG. 4 is a front-elevational view of the heated cover.

For purposes of description herein, the terms "upper," "lower," "right," "left," "rear," "front," "vertical," "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions, and other physical characteristics relating to the embodiments disclosed herein are not to be considered as limiting, unless the claims by their language expressly state otherwise.

The reference numeral 2 (FIG. 1) generally designates an indicator light embodying the present invention. Indicator light 2 is particularly adapted for use on vehicles and the like, such as the illustrated school bus 4. Indicator light 2 (FIG. 2) includes a heated cover 6, which is operatively connected to indicator light 2, and comprises a thermally conductive, translucent cover plate 8, having an exterior surface 10 and interior surface 12. An elongate resistor 14 (FIG. 3) is operatively connected to the interior surface 12 of cover plate 8 in a widespread pattern to heat at least a major portion of the exterior surface 10 of cover plate 8. Resistor 14 is electrically connected to the electrical system 16 of vehicle 4 to induce an electrical current through resistor 14, such that frozen particulate on the exterior surface 10 of cover plate 8 is melted for improved visibility at the indicator light 2, and related vehicle safety.

Figure 6:
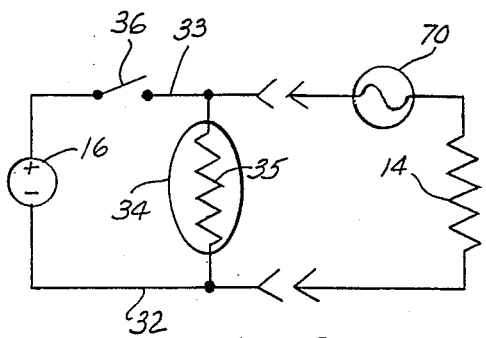
FIG. 6 is a circuit diagram depicting the connection of the indicator light to a self-contained electrical system of a vehicle.

Indicator light 2 is shown used in conjunction with the illustrated school bus 4. However, indicator light 2 is equally applicable to other vehicles subjected to extensive periods of wintry conditions, such as trucks, snowplows, ambulances, fire engines, police cars and the like. Indicator light 2 is particularly suitable for use on vehicles, such as snowplows, which are used to aid society in such tasks as clearing ice and snow from emergency roadways or military runways which must always be kept clear for purposes of national security. It is necessary that the vehicle 4 have an electrical system 16, which typically comprises a battery and an alternator or the like. Indicator light 2 includes a socket 34 (FIG. 2) which is operatively connected to the vehicle electrical system 16 and a switch 36 by conductors 32 and 33, as illustrated in FIG. 6. Switch 36 is preferably located in the cab or driving compartment of vehicle 4 for easy access by the vehicle operator. A fuse 70 is optionally included with the circuits of FIGS. 6 and 7 to protect elongate resistor 14 from overloading current levels.

Figure 7:
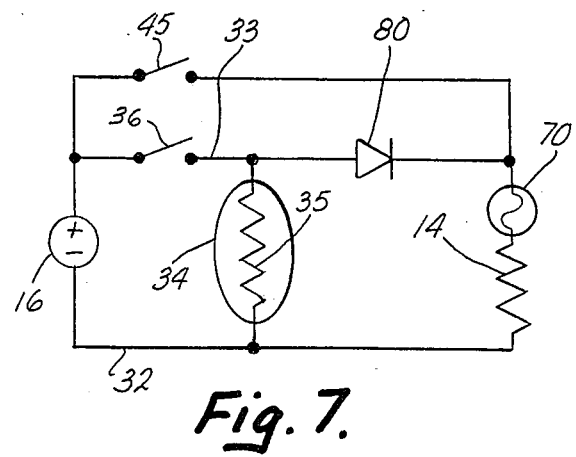
FIG. 7 is a circuit diagram depicting an alternative connection of the indicator light to a self-contained electrical system of a vehicle.

Receptacle 20 (FIG. 2), which is held into aperture 22 at lip 21, includes a concave reflective surface 24 and mounting strip 26. Centered in reflective surface 24 is a socket 34 which receives a bulb 35. Bulb 35 is conventionally wired to transmit signals for indicating turning, braking, etc. Closing of switch 36 provides voltage and current to both bulb 35 and resistor 14 (FIG. 6) as well as vehicle headlights (not shown) and optionally other indicator lights 3 on vehicle 4 (FIG. 1). Alternatively, the components could be rewired so that the resistor 14 is responsive to one of two separate switches, i.e., the switch 36 that controls the headlights and indicator lights 2, or a switch 45 that controls each resistor 14 associated with each cover 6 (FIG. 7). A diode 80 should be added to the circuit of FIG. 7 to avoid the backflow of current through socket 34 and bulb 35 when only switch 45 is closed.

A back-up light socket 37 and reflector plate 38 is mounted around the upper portion of receptacle 20 as demonstrated in FIG. 2. Back-up socket 37 receives back-up light bulb 39 and the back-up light socket 37 is conventionally wired to electrical system 16 via wires 40 and 41 for purposes of illuminating back-up bulb 38 when vehicle 4 is placed in reverse gear. Mounting strip 26 has apertures 28–31, one in each corner, for purposes of mounting cover 6 thereon.

As best seen in FIGS. 3 and 4, cover 6, which illustratively is a lens, comprises a thermally conductive, translucent cover plate 8 constructed from an integrally molded plastic. Although in the preferred embodiment cover 6 assumes a rectangular shape, cover 6 could just as easily be circular in shape, or any other suitable shape. Cover plate 8 includes an aperture 42 receiving a back-up light cover 43, and has exterior surface 10 and interior surface 12. A central section 17 comprising back-up light cover 43 received in aperture 42, and a raised portion 18 providing a running light/brake light lens. Surrounding central section 17 is a smooth marginal portion 19. In the present embodiment, indicator light 2 is covered by a lens 6; however, in other embodiments various types of covers would be suitable for employment as cover 6. For example, cover 6 could just as easily be a flat sheet of plastic or any other suitable cover that would fit over aperture 22 for mounting on strip 26. Additionally, in an alternative embodiment cover 6 could be incorporated into a sealed beam unit.

Figure 5:
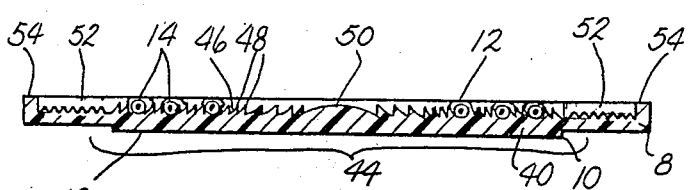
FIG. 5 is a horizontal, cross-sectional view taken along plane V—V of FIG. 3.

A light focusing section 44 including a concentric pattern of grooves 46 is molded on the interior surface 12 of cover plate 8 for purposes of focusing light rays from bulb 35. Each groove 46 is defined by two, circular, sloping ridges 48 (FIG. 5) and grooves 46 extend radially outward from the center 50 until terminating into a reflective portion 52. Reflective portion 52, which is comprised of longitudinally extending, pyramidally-shaped projections (FIG. 5) on interior surface 12, surrounds section 44 and aperture 42 for purposes of reflecting any rays directed toward cover 6 in the dark. Increased reflectivity enhances the safety of vehicle 4 by making it more visible to approaching traffic at night, even when parked along the side of a road with its lights turned off. Encircling the interior surface 12 of cover plate 8 is raised rim portion 54 in which four apertures 56–59 are located—one in each corner.

Elongate resistor 14 is operatively connected in a widespread pattern to cover plate 8 to heat at least a major portion of the exterior surface 10 of cover plate 8. The illustrated resistor 14 comprises a flexible wire that is bent in such a way as to conform with some of the grooves 46, as best demonstrated in FIGS. 3 and 5. Resistor 14 may be positioned or mounted in selected grooves 46 with an adhesive bond (FIG. 5), or inserted between the exterior surface 10 and interior surface 12 of cover plate 8 during the molding of the lens plate.

Electrical connector 63 (FIG. 3), in the present embodiment, comprises wires 65 and 66 coupled with wires 71 and 72 via connector 74. Resistor 14 includes terminal ends 68 and 69 for purposes of electrically connecting resistor 14 using connector 63 to electrical system 16 to induce an electrical current through cover 6. Illustrated wires 65 and 66 are soldered to resistor ends or terminals 68 and 69, respectively, and coupled with wires 71 and 72 by way of a splicing connector 74, to facilitate easy release of lens 6 from indicator light 2. In an alternative embodiment wires 65 and 66 can be spliced directly into bulb 35. Consequently, a connection between electrical system 16 and resistor 14 is completed upon inserting bulb 35 into socket 34.

In the preferred embodiment, the translucent cover plate 8 is composed of an acrylic polymer such as polymethyl methacrylate. Consequently, plate 8 is rigid so that it can both be heated, and withstand adverse weather conditions, without changing shape or losing its desired protective form. The total length of copper wires 65, 66 coupled with copper wires 71 and 72 by way of the rubber coated splicing connector 74 is at least 10 inches. Such length is great enough to allow convenient attachment of resistor 14 to socket 34. Resistor 14, which is composed of a highly resistive metal, such as bare nickel or chromium, or resistive paint or tape, has a resistance of approximately 6 ohms and draws a current of approximately 2 amps.

In one embodiment, resistor 14 is affixed to light focusing section 44 as illustrated in FIG. 3. The resistor 14 follows a looping path from terminal end 68 to terminal end 69. Beginning at end 69, resistor 14 completes a path consisting of the better part of one circle around center 50 and shifts by ninety degrees to the right crossing three grooves. After completing an arc of about 300 degrees in a counter-clockwise direction, resistor 14 shifts by ninety degrees to the right crossing two grooves. The outermost arc of about 320 degrees terminates at end 68. In total, three partial loops, covering the majority of light focusing section 44 are formed. When resistive wire is used to form the loops, the gauge of the wire will preferably vary according to the area of focusing section 44. In other words, for larger areas the gauge is preferably increased and vice versa. The resistor 14 is illustratively arranged in the above-mentioned path, coated with epoxy cement, and allowed to set for a suitable period of time. By affixing the resistor 14 to light focusing section 44 in three evenly spaced partial loops, heat is dissipated over the entire portion of section 44, constituting 41% of the area of cover 6. Since the area of light focusing section 44 is 18 square inches, and the conventional electrical system 16, which in the illustrated embodiment, operates at 12 volts, the power dissipated across section 44 is 1.3 watts/in$^2$. Residual heat is transferred from light focusing section 44 to brake light cover 42 and reflective portion 52 causing any frozen particulate to be melted from the exterior surface 10 of cover plate 8.

METHOD OF ASSEMBLY

Explanation of the assembly of indicator light 2 is made by reference to FIGS. 1, 2 and 6. Wires 71 and 72 are operatively connected in parallel with bulb socket 34 as illustrated in FIGS. 2 and 6, so that when switch 38 is in the "on" position, current is induced in resistor 14. Cover 6 is secured to mounting strip 26 (FIGS. 1 and 2) by aligning apertures 28–31 with apertures 56–59, respectively, and fastening cover 6 by using round head machine screws 76–79, or other similar fasteners.

Due to the construction of indicator light 2, cover 6 is easily fastened onto indicator light 2 for use during wintry periods as a replacement for a conventional lens, and disassembled and stored otherwise. Thus, indicator light 2 is adaptable for quick installation, for use during the winter, on any suitable vehicle in order to melt frozen particulate on the exterior surface thereof for improved visibility of said indicator light and related vehicle safety. Making indicator lights visible during periods of wintry conditions is not only advantageous because it allows those following the vehicle to be more aware of that vehicle's intentions with respect to braking, turning, etc., but also because it enhances emergency winter services. For instance, a snowplow employing the present indicator light is more visible to other vehicles, thus affording them the opportunity to take any necessary safety precautions.

In the foregoing description, it will be readily appreciated by those skilled in the art that modifications may be made to the invention without departing from the concepts disclosed herein. Such modifications are to be considered as included in the following claims unless these claims by their language expressly state otherwise.

The embodiments of the invention in which an exclusive property or privilege is claimed are defined as follows:

1. In an indicator light for vehicles and the like of the type having a self-contained electrical system electrically connected with a bulb portion of the light to selectively illuminate said bulb for indicating vehicle activity, the improvement of a heated cover comprising:
    a thermally conductive, translucent cover plate having interior and exterior surfaces through which light from said bulb is transmitted when said bulb is illuminated;
    means for operatively connecting said cover plate with said light;
    an elongate electrical resistor operatively connected with said cover plate and arranged thereon in a sufficiently widespread pattern to heat at least a major portion of the exterior surface of said cover, yet permit light from said bulb to pass through said cover plate;
    means for electrically connecting said resistor with the electrical system of the vehicle to induce an electrical current through said resistor and thereby produce sufficient heat in said cover plate to melt frozen particulate on the exterior surface thereof for improved visibility of said indicator light and related vehicle safety.

2. An indicator light as set forth in claim 1, wherein: said elongate electrical resistor comprises a wire constructed from a flexible material.

3. An indicator light as set forth in claim 2, wherein: said wire is embedded in said translucent cover plate between said interior and exterior surfaces.

4. An indicator light as set forth in claim 3, wherein: said wire is integrally molded in said cover plate adjacent the interior surface thereof.

5. An indicator light as set forth in claim 4, wherein: said interior surface of said translucent cover wherein:
    said interior surface of said translucent cover includes a plurality of circular grooves arranged in a concentric pattern to focus light from said bulb; and said wire is formed in concentric circular loops, and is received in selected portions of said cover grooves, to avoid interference.

6. An indicator light as set forth in claim 5, wherein: the electrical system comprises a 12-volt direct current source.

7. An indicator light as set forth in claim 6, wherein: said indicator light includes a switch whereby flow of said electrical current through said resistor can be regulated by use of said switch.

8. An indicator light as set forth in claim 7, wherein: said indicator light comprises a rear signal for the vehicle.

9. An indicator light as set forth in claim 8, wherein: said connecting means employed to connect said resistor with the self-contained electrical system of said vehicle comprises wires including male and female connectors whereby said translucent cover plate can be readily installed on or removed from the vehicle without having to splice said wires.

10. An indicator light as set forth in claim 1, wherein: said wire is embedded in said translucent cover plate between said interior and exterior surfaces.

11. An indicator light as set forth in claim 1, wherein: said interior surface of said translucent cover includes a plurality of circular grooves arranged in a concentric pattern to focus light from said bulb; and said wire is formed in concentric circular loops and is received in selected portions of said cover grooves, to avoid interference.

12. An indicator light as set forth in claim 1, wherein: the electrical system comprises a 12-volt direct current source.

13. An indicator light as set forth in claim 1, wherein: said indicator light includes a switch whereby flow of said electrical current through said resistor can be regulated by use of said switch.

14. An indicator light as set forth in claim 1, wherein: said indicator light comprises a rear signal for the vehicle.

15. An indicator light as set forth in claim 1, wherein:
said connecting means employed to connect said resistor with the self-contained electrical system of said vehicle comprises wires including male and female connectors whereby said translucent lens plate can be readily installed on or removed from the vehicle without having to splice said wires.

16. An indicator light cover for vehicles and the like of the type having a self-contained electrical system electrically connected with a bulb portion of a light to selectively illuminate the bulb for indicating vehicle activity, said cover comprising:
a thermally conductive, translucent cover plate having interior and exterior surfaces through which light from the bulb is transmitted when the bulb is illuminated;
means for operatively connecting said cover plate with the light;
an elongate electrical resistor operably connected with said cover plate and arranged thereon in a sufficiently widespread pattern to heat at least a major portion of the exterior surface of said cover, yet permit light from the bulb to pass through said cover plate;
means for electrically connecting said resistor with the electrical system of the vehicle to induce an electrical current through said resistor and thereby produce sufficient heat in said cover plate to melt frozen particulate on the exterior surface thereof for improved visibility of the indicator light and related vehicle safety.

17. An indicator light cover as set forth in claim 16 wherein:
said interior surface of said translucent cover includes a plurality of circular grooves arranged in a concentric pattern to focus light from said bulb; and said wire is formed in concentric circular loops and is received in selective portions of said cover grooves, to avoid interference.

18. A method for manufacturing a vehicle indicator light cover comprising:
providing a thermally conductive, translucent cover plate having interior and exterior surfaces;
operatively mounting an elongate electrical resistor on the cover plate in a sufficiently widespread pattern to heat at least a major portion of the exterior surface of the cover plate, yet permit light to pass through the cover plate.

19. A method for manufacturing an indicator light cover as set forth in claim 18 wherein said mounting step includes applying an adhesive over a substantial portion of the resistor to bond the resistor to the cover plate.

20. A method for manufacturing an indicator light cover as set forth in claim 19 wherein said mounting step includes molding said elongate resistor into the cover plate.

21. A method for manufacturing an indicator light cover as set forth in claim 18 wherein said mounting step includes using a heated device to tackify an area on the cover plate interior surface, and embedding the resistor in the tackified area.

* * * * *

UNITED STATES PATENT AND TRADEMARK OFFICE
CERTIFICATE OF CORRECTION

PATENT NO. : 4,728,775

DATED : March 1, 1988

INVENTOR(S) : George A. Van Straten

It is certified that error appears in the above-identified patent and that said Letters Patent is hereby corrected as shown below:

Column 6, Line 24, Claim 5:
      delete "said interior surface of said translucent
          cover wherein:"

Signed and Sealed this

Sixth Day of September, 1988

*Attest:*

DONALD J. QUIGG

*Attesting Officer*      *Commissioner of Patents and Trademarks*